J. F. REILLY.
CABLE CARRIER.
APPLICATION FILED FEB. 18, 1922.

1,429,632. Patented Sept. 19, 1922.
3 SHEETS—SHEET 3.

Inventor:
James F. Reilly,
By Jas. C. Hobenswith
Attorney.

Patented Sept. 19, 1922.

1,429,632

UNITED STATES PATENT OFFICE.

JAMES F. REILLY, OF PHILADELPHIA, PENNSYLVANIA.

CABLE CARRIER.

Application filed February 18, 1922. Serial No. 537,466.

*To all whom it may concern:*

Be it known that I, JAMES F. REILLY, a citizen of the United States, residing at Philadelphia, in the county of Philadelphia and State of Pennsylvania, have invented certain new and useful Improvements in Cable Carriers, of which the following is a specification.

My invention relates to a cable carrier, that is to say, to a device which is particularly adaptable for use in connection with cable operated cableways for the purpose of supporting the operating cable at various points between the extremities of the cableway to thereby prevent said operating cable from unduly sagging and from fouling on the main cable upon which the trolley or carriage of the cableway travels.

More specifically considered, my invention relates to a device adapted to support the operating cables of cableways which are employed to transport materials from place to place by means of a trolley or carriage adapted to travel upon a main cable, the cable supporting device proper being so constructed and arranged as to be readily pushed aside by the trolley or carriage as the same passes along the main cable, but which is adapted to be automatically returned to its normal operative supporting position after the trolley or carriage has passed beyond the location of the supporting device, and which is so constructed and arranged as to be readily mounted with respect to the main cable at any required location.

The object, therefore, of my invention is to provide a simple and efficient device adapted to support the operating cable of cableways, which device is so constructed and arranged whereby the supporting members may be pushed aside by the trolley or carriage as the same passes the location of the device, but which is adapted to be automatically returned to its normal condition to again support the cable after the trolley has passed beyond the supporting device, which furthermore is so constructed and arranged as to be readily mountable at desired locations with respect to the main cable, and which, when so mounted, will readily adjust itself to the various shifting positions of the main cable with respect to the other cables and parts of the cableway.

The nature and characteristic features of my invention will be more readily understood from the following description, taken in connection with the accompanying drawings forming part hereof, in which Figure 1 is an elevational view, taken transversely to the longitudinal extension of the cableway, of a cable supporting device embodying the main features of my present invention;

Figure 1:
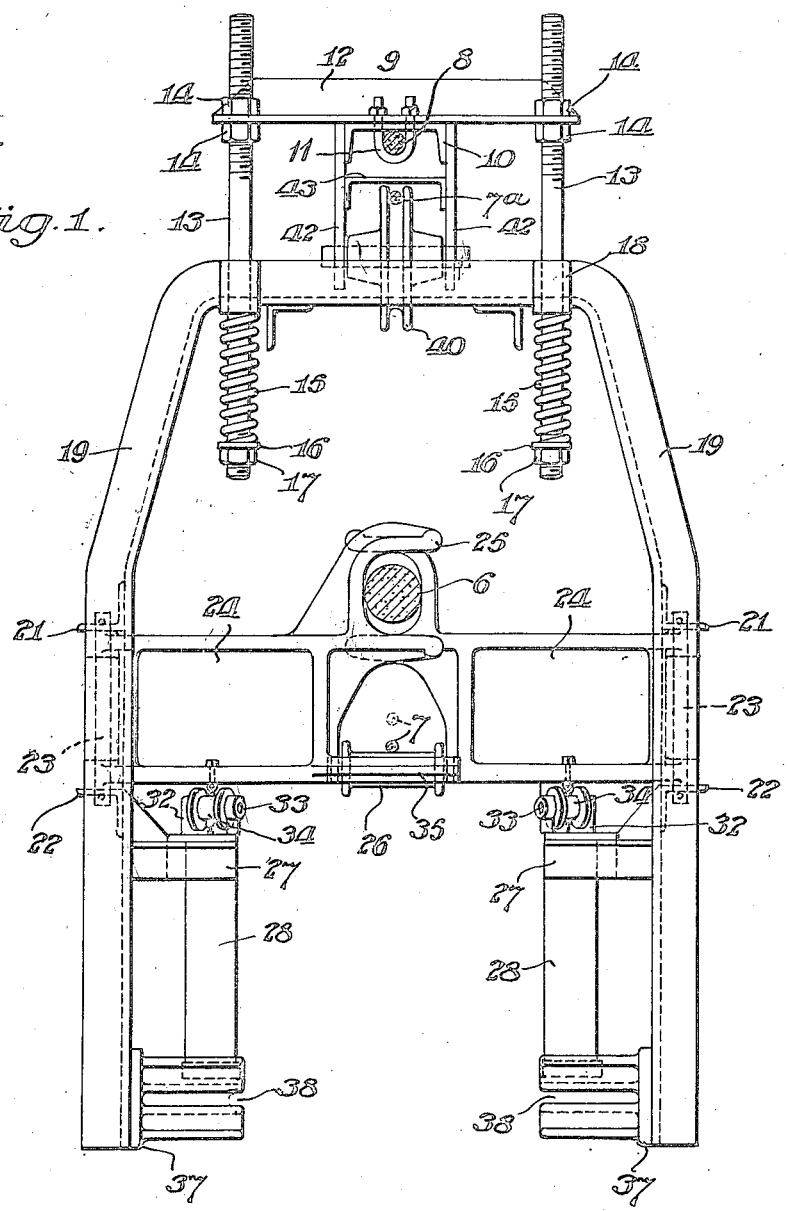

Referring to the drawings, in which a preferred form or embodiment of my invention is shown, 6 is the main cable upon which a trolley or carriage, not shown, but of any preferred construction, is adapted to travel, this cable being supported at its ends in any suitable manner such as is commonly employed in such cableways. The operating cable 7 is normally disposed beneath the main cable 6, and is adapted to actuate the trolley or carriage which travels upon said cableway. An auxiliary supporting cable 8 is provided, preferably arranged above the main cable 6. At desired locations at suitable intervals upon the auxiliary supporting cable 8 a series of the devices comprising the present invention are adapted to be secured.

The preferred manner of securing the supporting device to the auxiliary supporting cable 8 comprises a framework 9, consisting of a longitudinally extending channel beam 10 which is secured to the supporting cable 8 by means of U bolts 11 at any desired location. The channel beam 10 has secured thereto transversely extending angle iron beams 12, in the outer ends of which are secured vertically extending bolts 13, which bolts 13 are adjustable with respect to the angle iron beams 12 by means of nuts 14 which are threaded on the upper ends of the bolts 13. The lower ends of the bolts 13 are each provided with encircling coil springs 15, the lower ends of which bear against washers 16 which are positioned on the lower ends of bolts 13 by means of nuts 17.

The upper ends of the coil springs 15 bear against bracket members 18 which are secured to inverted U-shaped frames 19 whereby said U-shaped frames and the parts carried thereby, as hereinafter more particularly described, are resiliently supported with respect to the auxiliary supporting cable 8. The U-shaped frames 19 are connected to each other at their upper portions by means of longitudinally extending angle iron struts 20, and are also connected to each other at their intermediate portions by means of longitudinally extending angle iron struts 21 and 22. Mounted in the struts 21 and 22 are pivot pins 23 upon which swinging arms 24 are pivotally mounted. Each of the swinging arms 24 is provided at its inner upper corner with a forked portion 25 which is adapted, when the swinging arm 24 is in its normal operative position, to engage the main cable 6, to thereby position the frames 19 and the parts carried thereby with respect to said main cable.

Each of the swinging arms 24 also carries at its inner lower corner a spool-like sheave 26 which is adapted, when the swinging arm 24 is in its normal operative position, to support the operating cable 7 with respect to the main cable 6. The angle iron struts 22 also have bracket members 27 secured thereto, which bracket members 27 serve to support hollow cylinders 28 within which weights 29 are mounted, which are adapted to rise and fall therein. The upper end of each weight 29 has secured thereto one end of a chain or cable 30, the other end of which is secured to an eye bolt 31 which is carried by the swinging arm 24 at a point some distance from the pivotal axis thereof. The bracket members 27, which serve to support the cylinders 28, also serve to support brackets 32 within which are mounted stud shafts 33, and upon each of said stud shafts 33 there is journalled a pulley 34, one of these pulleys being provided on each side of each of the chains or cables 30, being adapted to provide a means for guiding said chains or cables when the swinging arms 24 are moved out of their normal operative positions to the one side or the other, as the case may be, and as will hereinafter be more fully explained.

Figure 2:
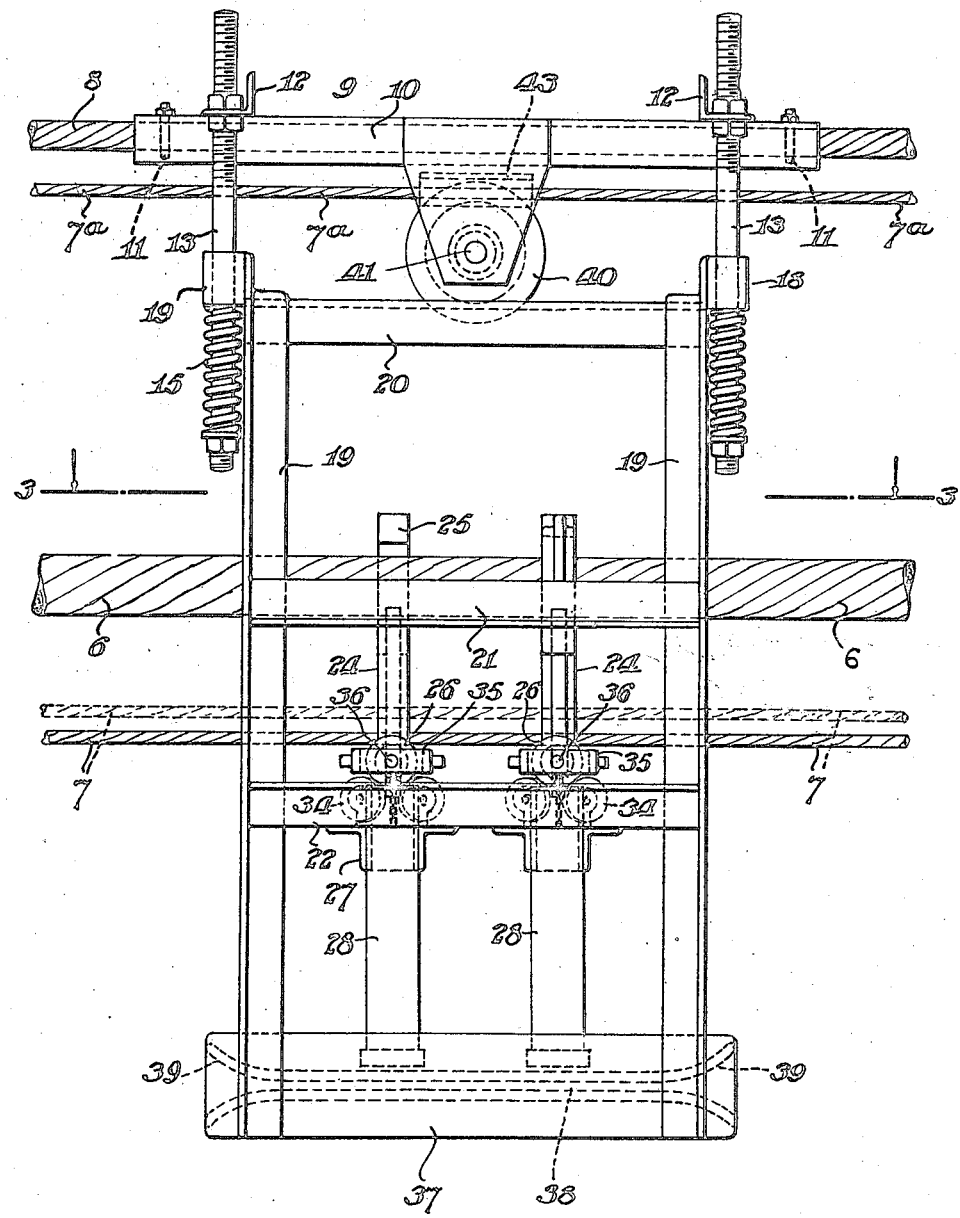
Fig. 2 is a side elevation thereof.
Figure 3:
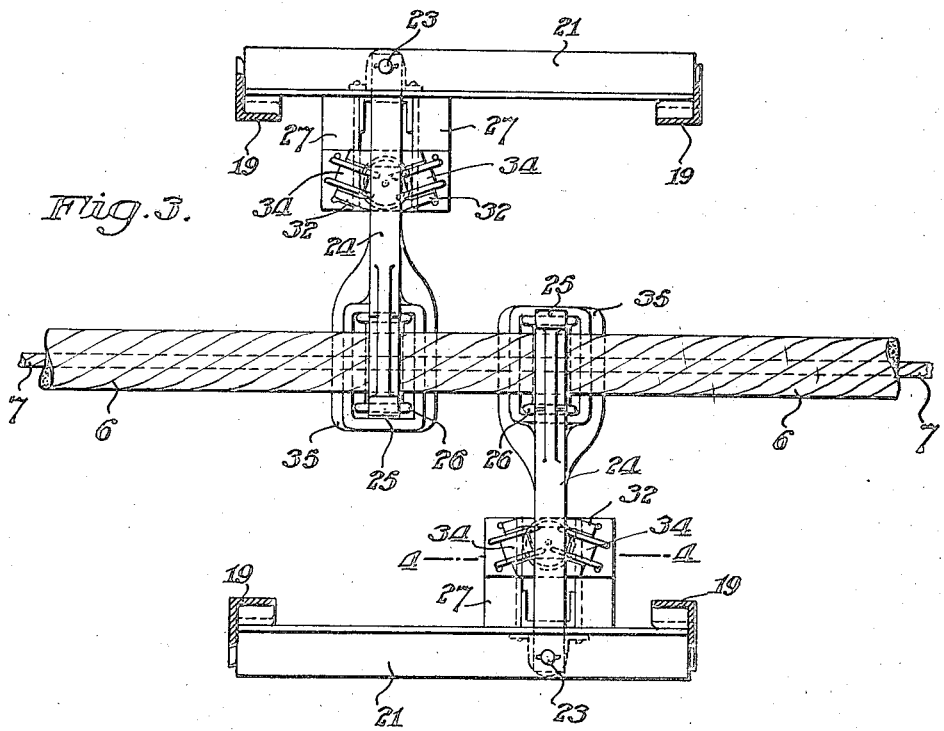
Fig. 3 is a horizontal section thereof taken approximately on the line 3—3 of Fig. 2.
Figure 4:
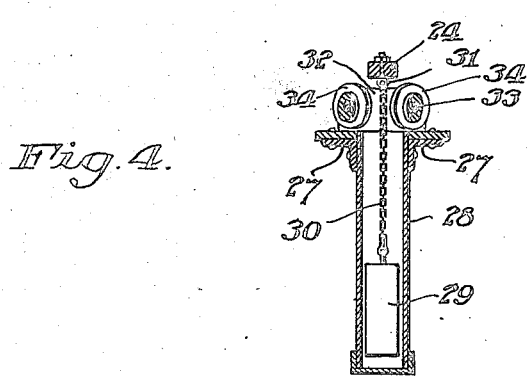
Fig. 4 is a vertical section thereof taken approximately on the line 4—4 of Fig. 3, illustrating certain details of the internal construction and arrangement of certain of the parts.

On each side of the spool-shaped sheave 26 there is provided a guard member 35 which is integral with, or otherwise secured to and carried by the swinging arm 24, as shown in Figs. 1, 2 and 3 of the drawings, the outer end of the guard member 35 also serving as a means for supporting the spindle 36 upon which the spool-shaped sheave 26 is journalled. The purpose of the guard member 35 is to prevent the trolley or carriage from abutting against the sheave 26 when the same passes through the cable supporting device above described.

The lower ends of the frames 19 are connected by means of longitudinally extending members 37, each provided with a longitudinally extending slot 38 having flaring ends as at 39. The purpose of this arrangement is to provide a means, in connection with a complementally located and shaped member on the trolley or carriage, not shown, for positively positioning the frames 19 with respect to the main cable 6 as the trolley or carriage passes the location of the cable supporting device hereinbefore described, as it will be readily understood, without specific illustration of the trolley or carriage, that the provision of a projecting member on each side thereof, adapted to engage and pass through the slots 38 of the member 37, will properly position the supporting device with respect to said main cable, notwithstanding inequalities in the position of the auxiliary supporting cable 8 with respect to the main cable 6.

The return line 7ª of the operating cable 7 may extend below the auxiliary supporting cable 8, and may be properly positioned with respect to this cable as well as the other cables by means of a sheave 40 which is journalled on a shaft 41 mounted in depending brackets 42 which are carried by the longitudinally extending channel beam 10, hereinbefore mentioned, as clearly illustrated in Figs. 1 and 2 of the drawings. A guard plate 43 may be arranged above the sheave 40 to prevent the return line 7ª of the operating cable from leaving the groove of the sheave 40.

The operation of the device will now be readily understood. The operating cable or cables 7 of the cable operated cableway normally rest upon and are supported by the spool-shaped sheaves 26 which, as before stated, are journalled in the inner lower corners of the swinging arms 24, and thereby serve to prevent said operating cable from abnormally sagging below the main cable 6, or becoming fouled therewith.

When, however, the trolley or carriage approaches the location of the cable supporting device, the cable being attached to or extending into the trolley or carriage at a point a slight distance above the location of the sheave 26, the cable will be raised with respect to the main cable to the position as indicated in dotted lines in Figs. 1 and 2 of the drawings. When the trolley or carriage approaches still closer to the cable supporting device, one end of the same will encounter one or the other of the swinging arms 24, depending upon which side the trolley or carriage approaches from, and as the trolley or carriage continues to travel along the cableway through the supporting device the swinging arms will be pushed aside by the same.

When the swinging arms 24 are each pushed aside by the trolley or carriage, the chain or cable 30 which is provided for each of said swinging arms 24 will be pulled over one or the other of the pair of guide pulleys 34, and as the swinging action continues, the weight 29 will be lifted within the cylinder 28 until, as the trolley or carriage passes beyond the ends of the respective swinging arms, the same will then be free to return to their normal positions, and will do so by reason of the pull of the weight 29 upon the chain or cable 30, which, as before stated, has its upper end connected to the swinging arm 24, whereupon, as the swinging arm 24 returns to its normal position, and as the trolley or carriage continues to pass to a point some distance beyond the same, the cable 7 will again be permitted to sag sufficiently to rest upon the sheave 26.

As the trolley or carriage passes through the cable supporting device, suitable projections carried by the trolley or carriage, not shown, may engage the slots 38 of the members 37, thereby positively positioning the frame 19 with respect to the main cable 6 as the trolley or carriage is passing through, any inequalities in the tension of the auxiliary supporting cable 8 being compensated for by reason of the resilient connection between the framework which is secured to said auxiliary supporting cable 8 and the main frame of the device. When, however, the trolley or carriage is some distance away from the cable supporting device, the forked ends 25 of the swinging arms 24 will maintain the proper relationship between the auxiliary supporting cable 8 and the main cable 6.

It should, of course, be understood that the cable supporting devices hereinbefore described will be provided at intervals along the cableway, for the purpose of supporting the operating cable thereof, being arranged at sufficient intervals to properly support said cable against undue sagging and fouling with the other cables. It will also be noted that the return line of the operating cable will be supported by means of the sheaves which are carried directly from the portion of the structure which is secured to the auxiliary supporting cable.

It will be seen that there is thus provided a simple and efficient device for supporting the operating cable of cable operated cableways which is so constructed and arranged whereby the same may be readily mounted with respect to the cableway at any desired location, which device is entirely automatic in its action, is quite simple and relatively inexpensive, and which is not likely to be easily deranged or damaged in its operation.

Having thus described the nature and characteristic features of my present invention, what I claim as new and desire to secure by Letters Patent is:

1. A device for supporting the operating cable of a cable operated cableway comprising the combination with the main cable, of a framework and means for supporting said framework with respect to said main cable, means supported by said framework adapted to engage the main cable in the normal position of said means, and means associated with said main cable engaging means adapted to support the operating cable in said normal position.

2. A device for supporting the operating cable of a cable operated cableway comprising the combination with the main cable, of a framework resiliently supported with respect to said main cable, means supported by said framework adapted to engage the main cable in the normal position of said means, and means associated with said main cable engaging means adapted to support the operating cable in said normal position.

3. A device for supporting the operating cable of a cable operated cableway comprising the combination with the main cable, of an auxiliary supporting cable, a framework resiliently connected to the auxiliary supporting cable, means supported by said framework adapted to engage the main cable in the normal position of said means, and means associated with said main cable engaging means adapted to support the operating cable in said normal position.

4. A device for supporting the operating cable of a cable operated cableway comprising the combination with the main cable, of an auxiliary supporting cable, a framework carried thereby, a main frame resiliently connected to the framework secured to the auxiliary supporting cable, means supported by said main framework adapted to engage the main cable in the normal position of said means, and means associated with said main cable engaging means adapted to support the operating cable in said normal position.

5. A device for supporting the operating cable of a cable operated cableway comprising the combination with the main cable, of an auxiliary supporting cable, a framework carried thereby, a main frame resiliently connected to the framework secured to the auxiliary supporting cable, means supported by said main framework adapted to engage the main cable in the normal position of said means, and means carried by said main cable engaging means adapted to support the operating cable in said normal position.

6. A device for supporting the operating cable of a cable operated cableway comprising the combination with the main cable, of an auxiliary supporting cable, a framework resiliently connected to the auxiliary supporting cable, means supported by said framework adapted to engage the main cable in the normal position of said means, means carried by said main cable engaging means adapted to support the operating cable in said normal position, and means for supporting the return line of the operating cable.

7. A device for supporting the operating cable of a cable operated cableway comprising the combination with the main cable, of an auxiliary supporting cable, a framework carried thereby, a main frame resiliently connected to the framework secured to the auxiliary supporting cable, means supported by said main framework adapted to engage the main cable in the normal position of said means, means carried by said main cable engaging means adapted to support the operating cable in said normal position, and means carried by the framework carried by the auxiliary supporting cable for supporting the return line of the operating cable.

8. A device for supporting the operating cable of a cable operated cableway comprising the combination with the main cable, of an auxiliary supporting cable, a framework carried thereby, a main frame resiliently connected to the framework secured to the auxiliary supporting cable, means supported by said main framework adapted to engage the main cable in the normal position of said means, means carried by said main cable engaging means adapted to support the operating cable in said normal position, and a sheave carried by the framework carried by the auxiliary supporting cable for supporting the return line of the operating cable.

9. A device for supporting the operating cable of a cable operated cableway comprising the combination with the main cable, of an auxiliary supporting cable, a framework carried thereby, a main frame resiliently connected to the framework secured to the auxiliary supporting cable, means supported by said main framework adapted to engage the main cable in the normal position of said means, means carried by said main cable engaging means adapted to support the operating cable in said normal position, and means carried by the main frame adapted to be engaged by a portion of the trolley or carriage travelling on the main cable to thereby position said main frame with respect to the main cable as the trolley or carriage passes through the supporting device.

10. A device for supporting the operating cable of a cable operated cableway comprising the combination with the main cable, of an auxiliary supporting cable, a framework carried thereby, a main frame resiliently connected to the framework secured to the auxiliary supporting cable, a swinging arm supported by said main framework having a portion adapted to engage the main cable in the normal position of said swinging arm, means carried by said swinging arm adapted to support the operating cable, and means for maintaining said swinging arm in its normal operative position and for returning the same thereto.

11. A device for supporting the operating cable of a cable operated cableway comprising the combination with the main cable, of an auxiliary supporting cable, a framework carried thereby, a main frame resiliently connected to the framework secured to the auxiliary supporting cable, swinging arms supported by said main framework having portions adapted to engage the main cable in the normal position of said swinging arms, means carried by each of said swinging arms adapted to support the operating cable, and means for maintaining each of said swinging arms in their normal operative positions and for returning the same thereto.

12. A device for supporting the operating cable of a cable operated cableway comprising the combination with the main cable, of an auxiliary supporting cable, a framework resiliently connected to the auxiliary supporting cable, a swinging arm supported by said framework having a portion adapted to engage the main cable in the normal position of said swinging arm, means carried by said swinging arm adapted to support the operating cable, and means for maintaining said swinging arm in its normal operative position and for returning the same thereto.

13. A device for supporting the operating cable of a cable operated cableway comprising the combination with the main cable, of an auxiliary supporting cable, a framework resiliently connected to the auxiliary supporting cable, swinging arms supported by said main framework having portions adapted to engage the main cable in the normal position of said swinging arms, means carried by each of said swinging arms adapted to support the operating cable, and means for maintaining each of said swinging arms in their normal operative positions and for returning the same thereto.

14. A device for supporting the operating cable of a cable operated cableway comprising the combination with the main cable, of an auxiliary supporting cable, a framework resiliently connected to the auxiliary supporting cable, swinging arms supported by said main framework having portions adapted to engage the main cable in the normal position of said swinging arms, a sheave mounted on the end of each of said swinging arms adapted to support the operating cable, and means for maintaining each of said swinging arms in their normal operative positions and for returning the same thereto.

15. A device for supporting the operating cable of a cable operated cableway comprising the combination with the main cable, of an auxiliary supporting cable, a framework resiliently connected to the auxiliary supporting cable, swinging arms supported by said framework having forked ends adapted to engage the main cable in the normal position of said swinging arms, a sheave mounted on the end of each of said swinging arms adapted to support the operating cable, and means for maintaining each of said swinging arms in their normal operative positions and for returning the same thereto.

16. A device for supporting the operating cable of a cable operated cableway comprising the combination with the main cable, of an auxiliary supporting cable, a framework carried thereby, a main frame resiliently connected to the framework secured to the auxiliary supporting cable, swinging arms supported by said main framework having forked ends adapted to engage the main cable in the normal position of said swinging arms, a sheave mounted on the end of each of said swinging arms adapted to support the operating cable, and means for maintaining each of said swinging arms in their normal operative positions and for returning the same thereto.

17. A device for supporting the operating cable of a cable operated cableway comprising the combination with the main cable, of an auxiliary supporting cable, a framework resiliently connected to the auxiliary supporting cable, a swinging arm supported by said framework having a portion adapted to engage the main cable in the normal position of said swinging arm, means carried by said swinging arm adapted to support the operating cable, and means for maintaining said swinging arm in its normal operative position and for returning the same thereto, said means comprising a cable having one end connected to the swinging arm at a point some distance from the pivotal axis thereof, a weight secured to the other end of said cable, and means adapted to guide said cable to which said weight is attached when the swinging arm is moved out of its normal operative position.

18. A device for supporting the operating cable of a cable operated cableway comprising the combination with the main cable, of an auxiliary supporting cable, a framework resiliently connected to the auxiliary supporting cable, swinging arms supported by said framework having portions adapted to engage the main cable in the normal position of said swinging arms, means carrried by each of said swinging arms adapted to support the operating cable, and means for maintaining each of said swinging arms in their normal operative positions and for returning the same thereto, said means comprising a cable having one end connected to the swinging arm at a point some distance from the pivotal axis thereof, a weight secured to the other end of said cable, and means adapted to guide said cable to which said weight is attached when the swinging arm is moved out of its normal operative position.

19. A device for supporting the operating cable of a cable operated cableway comprising the combination with the main cable, of an auxiliary supporting cable, a framework resiliently connected to the auxiliary supporting cable, swinging arms supported by said framework having portions adapted to engage the main cable in the normal position of said swinging arms, a sheave mounted on the end of each of said swinging arms adapted to support the operating cable, and means for maintaining each of said swinging arms in their normal operative positions and for returning the same thereto, said means comprising a cable having one end connected to the swinging arm at a point some distance from the pivotal axis thereof, a weight secured to the other end of said cable, and means adapted to guide said cable to which said weight is attached when the swinging arm is moved out of its normal operative position.

20. A device for supporting the operating cable of a cable operated cableway comprising the combination with the main cable, of an auxiliary supporting cable, a framework resiliently connected to the auxiliary supporting cable, swinging arms supported by said framework having forked ends adapted to engage the main cable in the normal position of said swinging arms, a sheave mounted on the end of each of said swinging arms adapted to support the operating cable, and means for maintaining each of said swinging arms in their normal operative positions and for returning the same thereto, said means comprising a cable having one end connected to the swinging arm at a point some distance from the pivotal axis thereof, a weight secured to the other end of said cable, and means adapted to guide said cable to which said weight is attached when the swinging arm is moved out of its normal operative position.

21. A device for supporting the operating cable of a cable operated cableway comprising the combination with the main cable, of an auxiliary supporting cable, a framework carried thereby, a main frame resiliently connected to the framework secured to the auxiliary supporting cable, swinging arms supported by said main framework having forked ends adapted to engage the main cable in the normal position of said swinging arms, a sheave mounted on the end of each of said swinging arms adapted to support the operating cable, and means for maintaining each of said swinging arms in their normal operative positions and for returning the same thereto, said means comprising a cable having one end connected to the swinging arm at a point some distance from the pivotal axis thereof, a weight secured to the other end of said cable, and pulleys adapted to guide said cable to which said weight is attached when the swinging arm is moved out of its normal operative position.

In testimony whereof, I have hereunto signed my name.

JAMES F. REILLY.